United States Patent [19]

Smith, Jr. et al.

[11] 4,020,342
[45] Apr. 26, 1977

[54] EARTH FORMATION SALINITY BY COMPARISON OF INELASTIC AND CAPTURE GAMMA RAY SPECTRA

[75] Inventors: Harry D. Smith, Jr.; Ward E. Schultz, both of Houston, Tex.

[73] Assignee: Texaco Inc., New York, N.Y.

[22] Filed: Dec. 22, 1975

[21] Appl. No.: 643,230

[52] U.S. Cl. .............................. 250/270; 250/262
[51] Int. Cl.$^2$ ........................................ G01V 5/00
[58] Field of Search ........................... 250/262, 270

[56] References Cited
UNITED STATES PATENTS

| | | | |
|---|---|---|---|
| 3,833,809 | 9/1974 | Beil | 250/270 |
| 3,886,355 | 5/1975 | Culver | 250/270 |

*Primary Examiner*—Archie R. Borchelt

*Attorney, Agent, or Firm*—Carl G. Ries; Thomas H. Whaley; William J. Beard

[57] ABSTRACT

Background corrected inelastic neutron scattering gamma ray counts for selected energy regions of the gamma ray spectrum corresponding to calcium and silicon are compared with thermal neutron capture gamma ray counts for selected energy regions of the gamma ray spectrum. These data are functionally related to chlorine presence and are used to derive an estimate of the salinity of earth formations. The inelastic scattering and thermal neutron capture gamma ray data are separated from each other by the use of a pulse neutron source and time gating techniques.

10 Claims, 5 Drawing Figures

EARTH FORMATION SALINITY BY COMPARISON OF INELASTIC AND CAPTURE GAMMA RAY SPECTRA

BACKGROUND OF THE IVENTION

This invention relates to radiological well logging methods for investigating the characteristics of subsurface earth formations traversed by a borehole and, more particularly, relates to improved neutron-gamma ray logging methods for determining the chlorine content of earth formations.

It is well known that oil and gas are more likely to be found in commercially recoverable quantities from relatively porous earth formations that from more highly consolidated and less permeable earth formations. It is also known that an oil or gas producing formation may be located by passing a neutron source through the borehole and measuring the intensity of secondary gamma ray radiation developing from the neutron irradiation as a function of borehole depth.

In particular the chlorine nucleus, which has a very high thermal neutron capture cross section (more so than that of the nuclei of other rather commonly found elements), is a good indicator of the location of salt water in subsurface earth formations. Thus, salt water filled limestone or sandstone layers will have a greater macroscopic thermal neutron capture cross section than similar formations which are oil saturated. By combining other porosity information, such as that detected by sonic or density logging tools, with the thermal neutron capture cross section data oil can be located. The macroscopic thermal neutron capture cross section has been observed in the past by measuring either chlorine characteristic thermal neutron capture gamma rays or the lifetime or decay constant of the thermal neutron population in the subsurface earth layer being investigated.

The above-mentioned salt water detection techniques have proven to be very useful in the past in locating oil and gas bearing earth formations. However, many spurious indications have been produced by depending solely on thermal neutron capture logging techniques due to the fact that the techniques require the presence of salinity in rather large amounts to be reliable. There has been no commercially available well logging method which could distinguish oil from water in earth formations where the water salinity was low. For example, the above-mentioned chlorine capture (of neutron lifetime) logs require water salinities in excess of about 30,000 to 100,000 parts per million sodium chloride before oil located in the pores of the earth formations can be reliably differentiated from water. The present invention combines inelastic gamma ray scattering measurements with thermal neutron capture gamma ray measurements to overcome some of these difficulties.

It has been proposed in the prior art to make a measurement of at least a portion of the inelastic neutron scattering gamma ray energy spectrum from neutron irradiated earth formations. This has been proposed because carbon and oxygen nuclei in the earth formations surrounding the borehole can engage in appreciable inelastic fast neutron scattering even through the thermal neutron capture cross section of these nuclei is relatively small. This type of fast neutron interaction logging has been limited in the past to some extent because the inelastic neutron scattering cross sections for carbon and oxygen only become appreciable if relatively high energy neutrons are available to provide the interaction. In the past it has been difficult to provide sufficient quantities of highly energetic neutrons to reliably perform this type of log. The development of improved electronically pulsed high energy neutron generators has made possible the measurement of the inelastic fast neutron scattering gamma ray energy spectrum from relatively high energy neutron irradiated earth formations. Attempts have been made to measure the carbon and oxygen inelastic neutron scattering interactions with 14MEV neutrons generated in pulsed neutron generators of the deuterium-tritium reaction type.

A problem which has arisen has been due to the fact that characteristic gamma rays generated in neutron inelastic scattering are themselves scattered by other electrons and nuclei. This generally tends to make the scattered gamma ray lose energy to some extent with each such Compton scattering interaction. Thus, a higher energy gamma ray having a characteristic initial energy resulting from an inelastic scattering event can appear to have totally different lower energy by the time it reaches the detector in the logging sonde due to the multiple Compton scatterings. This type of gamma ray scattering process generally masks or smears characteristic peaks which might ordinarily occur in the inelastic gamma ray energy spectrum.

In order to obtain reasonable count rates at reasonable source to detector spacings it is desirable to repetitively generate the high energy neutron pulses at as high a repitition rate as practicable. However, when earth formations are repetitively irradiated by a pulsed neutron source at a very high repetition rate, some neutrons may still linger from the previous neutron pulse (in a thermalized condition) when the next or subsequent neutron pulse is emitted. Since these neutrons are thermalized, they can cause thermal neutron capture interactions producing thermal neutron capture gamma rays which could, during the subsequent neutron pulse when the inelastic scattering interactions occur, tend to be confused with the inelastic scattering gamma rays sought to be measured. This could occur because the inelastic neutron scattering gamma ray energy spectrum which is sought to be measured must be measured essentially only during the time interval that the neutron generator is turned on. This occurs because the population of high energy neutrons falls off very quickly due to the inelastic neutron scattering phenomena itself being a relatively strong nuclear interaction and because of elastic neutron scattering with the hydrogen present. This problem may be overcome, however, by employing certain background correction techniques such as those disclosed in U.S. Pat. No. 3,780,303 which is assigned to the assignee of the present invention.

The system disclosed in the aforementioned patent utilizes a plurality of energy dependent windows or intervals to observe the relative count rates in selected portions of the inelastic neutron scattering gamma ray energy spectrum. Time dependent gating means isolate gamma rays resulting from the inelastic scattering of neutrons by the earth formations surrounding the well borehole. The timing means also provide a separate time dependent isolation of thermal neutron capture gamma rays just prior to each high energy neutron pulse. Gamma rays observed during this separate interval are primarily the result of neutron capture interactions caused by any thermal neutrons remaining in the vicinity of the gamma ray detector. Of course, some gamma rays due to natural formation radioactivity and some gamma rays due to neutron activation of the formation elements may also be detected in this manner. The separate time dependent isolation of gamma rays just prior to each neutron pulse provides a background estimate of remaining thermal neutrons. Energy ranges or "windows" in the selected portions of the inelastic gamma ray energy spectrum are positioned and their width or energy range chosen so that the characteristic gamma rays resulting from inelastic scattering of fast neutrons (hereafter referred to as inelastic gamma rays) from carbon, oxygen, silicon and calcium may be detected. The carbon and oxygen inelastic gamma rays may be used to provide an estimate of the hydrocarbon content of the earth formations which surround the borehole. The calcium and silicon inelastic gamma rays provide an indication of the lithology of the earth formations (i.e. sand or lime formations). Gamma ray counts occurring in the same carbon, oxygen, silicon and calcium energy windows during the separate background time isolation period and resulting primarily from thermal neutron capture may then be subtracted from the counts due to gamma rays resulting from the inelastic scattering interactions. This background subtraction technique enables the repetition rate of the high energy neutron pulses to be increased while not introducing unwanted counts from capture gamma rays caused by thermal neutrons.

By time isolating a third separate portion and appropriately choosing the location of energy windows in the capture gamma ray energy spectrum, capture gamma rays produced by silicon and calcium can also be measured and developed into a capture calcuim/silicon (Ca/Si) ratio. This ratio, like the inelastic Ca/Si ration, can be used to assist in lithology identification. In the capture Ca/Si ratio, however, there is a strong salinity dependence, unlike the situation with the inelastic ratio of the same two elements. This occurs because of the relative similarity of the capture gamma ray spectra of clacium and chlorine. This salinity dependence limits the usefulness of a capture Ca/Si ratio as a lithology indicator, but can be used to diferentiate saline from non-saline intervals. To accomplish this, the inelastic Ca/Si and capture Ca/Si ratios are compared (possibly by overlaying log curves) across a section of a well; in zones at anomalous salinity the ratios diverge, whereas in other zones the ratios behave similarly.

The features and advantages of the present invention are pointed out with particularity in the appended claims. The present invention is best understood by taking the following detailed description in conjunction with the appended drawings in which:

DESCRIPTION OF THE PREFERRED EMBODIMENT

Figure 1:
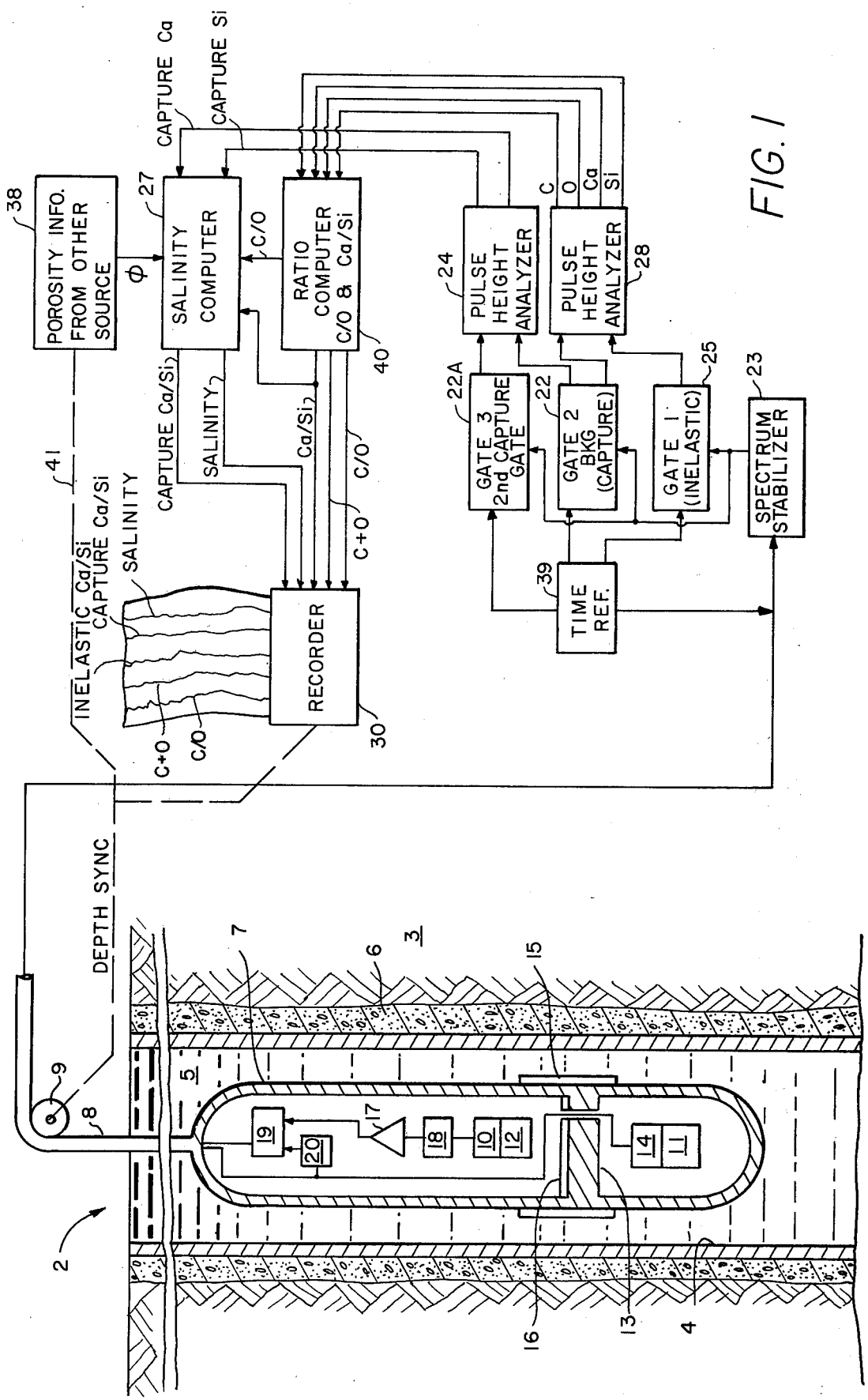
FIG. 1 is an overall schematic diagram of a well logging system in accordance with the invention.

Referring intially to FIG. 1 there may be seen a simplified functional representation in the form of a block diagram of a well logging system in accordance with the present invention. A borehole 2 penetrating earth formations 3 is lined with steel casing 4 and filled with a well fluid 5. While it will generally be the case that borehole 2 has a liquid well fluid therein, it is not necessary for the present invention to perform. The invention is also useful in gas or air filled boreholes. The steel casing 4 is cemented in place by cement layer 6 which also serves to prevent fluid communication between adjacent producing formations in the earth 3.

The downhole portion of the logging system is seen to be basically composed of an elongated, fluid tight, hollow, body member of sonde 7 which, during the logging operation, is passed longitudinally through the casing 4 and is sized for passage therethrough. Surface instrumentation, whose function will be discussed in more detail subsequently, is shown for processing and recording electrical representations of measurements provided by sonde 7. A well logging cable 8 passing over a sheave wheel 9 supports the sonde 7 in the borehole and also provides a communication path for electrical signals to and from the surface equipment and the sonde 7. The cable 8 may be of a conventional armoured well logging type and may have one or more electrical conductors for transmitting such signals between the sonde 7 and the surface apparatus.

Again referring to FIG. 1, the sonde 7 contains a source or accelerator for producing high energy neutrons 11. The neutron source 11 contemplated for use herein is a closed envelope electronically pulsed neutron source operating on the principle of the deuteriumtritium reaction (i.e. deuterium ions are accelerated onto a tritium impregnated target by an accelerating voltage). However, it will be understood by those skilled in the art that the invention is not limited thereto. Other types of pulsed neutron sources may be used, if desired. A suitable radiation detector comprising a photomultiplier tube 10 and a detector crystal 12 is provided in the sonde 7 for detecting gamma rays resulting from the inelastic scattering of high energy neutrons and thermal neutron capture by the earth formations 3 surrounding the well borehole 2. A radiation shield 13 of iron, tungsten, or other suitable material is interposed between the neutron accelerator 11 and the detector crystal 12 of the apparatus. Additionally, a thermal neutron shielding sleeve 15 is provided and may be located either as shown disposed about the exterior portion of the sonde 7 or, if desired, disposed on the interior wall portion thereof surrounding the detector crystal 12. A thermal neutron shielding disc 16 is also interposed between the radiation shielding material 13 and the detector crystal 12 to reduce the probability of gamma rays resulting from thermal neutron interactions in the detector. The detector crystal 12 may comprise a thallium doped sodium iodide, cesium iodide, or other like activated material which is optically coupled to he photomultiplier tube 10.

The radiation shielding 13 reduces the probability of direct neutron irradiation of the detector crystal 12 by neutrons emitted from the pulsed neutron source 11. The thermal neutron shielding disc 16 and cylinder 15 surrounding the detector crystal 12 may be of a suitable material such a boron or another material having a high thermal neutron capture cross section. This shield further serves to reduce the possibility of thermal neutrons which follow a tortuous path or which have been slowed down by the borehole fluid 5 or shielding material 13 from reaching the vicinity of the detector crystal 12 and possibly causing neutron irradiation of elements comprising the crystal. Moreover, the thermal neutron shield 15 16 reduces the probability of thermal neutrons from a previous accelerator neutron pulse interacting materials in the sonde itself or the detector crystal itself and causing the emission of gamma radiation during the time period when the inelastic neutron gamma rays are being observed.

As well known in the art, the scintillation crytal 12 produces a discrete flash of light whenever a gamma ray passes therethrough and exchanges energy with the crystal lattice structure. The photomultiplier tube 10 generates a voltage pulse proportional is height to the intensity of each such scintillation which occurs in the crystal 12. The intensity of such scintillations is functionally related to the energy of the gamma ray causing the light flash and thus a voltage pulse generated by the photomultiplier tube 10 has an amplitude functionally related to the energy of the corresponding gamma ray. These proportional voltage pulses produced by photomultiplier tube 10 comprise a detector signal which is supplied to a linear amplifier 17 via a discriminator 18. The discriminator 18 may be used, if desired to discriminate, for example, against the reaction I 127 $(n,\gamma)$ I 128. A preset bias level may be used to pass only pulses from the photomultiplier tube 10 which exceed the height corresponding to 1.78 MEV gamma rays generated in the inelastic scattering of neutrons by silicon nuclei. Other low energy background gammas which would otherwise contribute to "pulse pileup" or excessive instantaneous count rate may also be eliminated by he discriminator 18 in this manner, if desired.

The neutron accelerator 11 is preferably operated by a pulsing circuit 14 which may be of conventional design as known in the art and which functions to operate the accelerator in short duration pulses. The pulse duration is preferably maintained a short as possible (in the vicinity of five mircoseconds) in order to minimize the probability of thermal neutron interactions during each pulse of fast neutrons. Timing pulses are supplied by a timing reference 39 and are communicated over the cable 8 conductors. The timing pulses are supplied to the operational pulser 14 for accelerator 11 and are also supplied to a downhole reference pulser 20. For example, the pulser circuit 14 culd be activated by a timing pulse from the timing reference 39 to emit a neutron burst of a specified minimal time duration (approximately 5 microseconds). The repetition frequency of such bursts would then be controlled by the frequency of surface timing reference 39. Of course it will be appreciated that, if desired, the timing source 39 would be located in the downhole tool and pulses therefrom used in a similar manner at the surface to synchronize the operation of the system.

In making the inelastic fast neutron scattering measurements contemplated by the present invention and using neutron pulses of approximately 5 microseconds duration, it is desirable to repeat the pulses at repetition rates up to approximately 20,000 times per second. It is desirable to maintain as high a repetition rate as possible so that a large integral counting rate may be had without having undesirable "pulse pileup" occur. Pulse pileup is as previously mentioned, an excessive intantaneous counting rate phenomena. This is due to the fact that a logging system such as that of the present invention, due to its electronic circuitry and the bandwith limitation of the logging cable, has a finite intantaneous counting rate capability. Thus by obtaining optimal source to detector spacing this instantaneous rate limitation may be approached without being exceeded. Then by repeating the pulses as close together in time as possible a large integrated count may be achieved which enhances the statistical accuracy of the measurement.

Due to this very high pulse repetition rate encountered in the present invention, neutrons from a previous phase will tend to still be present in a thermalized condition when a subsequent neutron pulse starts. This causes the rapid build up of count pulses due to the combined effect of thermal neutrons and inelastic scattering gamma rays and which, if not compensated for, could lead to difficulties.

Figure 2:
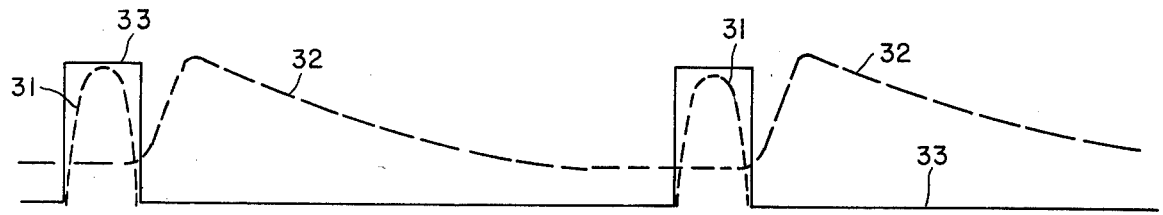
FIG. 2 is a timing diagram showing the relationship of accelerator and detector on time with respect to the population of gamma rays caused by inelatically scattered neutrons and thermal neutrons in the vicinity of the borehole.
Figure 2:
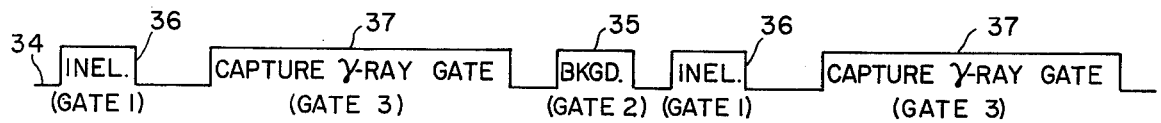

Referring now to FIG. 2, the relative time relationship of the neutron bursts or pulses to the operative portion of the gamma ray detector cycle and to the inelastic and thermal neutron populations are shown. The accelerator cycle is represented by the solid curve 33. The inelastic neutron population in the vicinity of the detector crystal 12 is represented by the dashed curve 31. The thermal neutron population in the vicinity of the detector is shown by the dotted line curve 32. The operative detector cycle is represented by the separate solid line curve 34. It will be noted that, for reasons to be discussed subsequently, for each neutron pulse generated three separate time isolation gate periods 35, 36, and 37 of the detector are provided by gates 22, 22A and 25. Time gating interval 36 provided by the gate 25 is chosen to generally coincide with the neutron accelerator "on" cycle. Time gating interval 35 provided by the gate 22 is chosen to sample the background gamma ray population (generally thermal capture) in the vicinity of the detector by examining gamma rays produced thereby in the energy ranges of interest just prior to initiation of an accelerator cycle. The third gating interval 37 of capture gamma rays i summed with counts into the background gate to use for obtaining a capture Ca/Si ratio measurement.

Still referring to FIG. 2, it will be noted that there is sudden and rapid build up of the inelastic gamma ray population (curve 31) which is essentially present only during the neutron pulse. The thermal neutron population curve (curve 32) builds up much slower and reaches a peak only after cessation of the 5 microseconds duration neutron pulse.

Referring again to FIG. 1, and bearing in mind this timing sequence, it will be observed that during the time interval that neutron accelerator 11 is activated, output signals from the photomultiplier tube 10 are conducted via the discriminator 18 and the linear amplifier 17 to a cable driver circuit 19 which may be of conventional design. The reference signal from reference pulser 20 has a known voltage amplitude and is also supplied to the cable driver 19. The reference pulse provided by the downhole reference pulser 20 is utilized at the surface in a gain control device or spectrum stabilizer 23 to control the overall gain of the system in a linear manner. This gain control function, of course, may be accomplished between neutron pulses if desired as the spectrum stabilizer 23 may be supplied with signals from the reference pulser 20 continuously or in any desired sequence.

Although not depicted in FIG. 1, it will be understood by those skilled in the art that electrical power may be supplied from a surface power source (not shown) via the well logging cable 8 to the downhole sonde 7. Suitable power supplies (not shown) are provided in the sonde 7 for powering the downhole portion of the equipment.

Since both the downhole pulse generator 14 and the surface timing gates 22, 22A and 25 which control data pulses from the downhole tool are timed from the same time reference 39, it is apparent that synchronism may be maintained between the surface equipment and the downhole equipment. Thus, the detected data signals may be time separated by the gates 22, 22A and 25 to select time isolated portions thereof for processing which are timed as desired relative to the emission of the neutrons in the manner discussed with respect to FIG. 2.

The output signals from the time gate 22 comprise a sequence of count pulses resulting from gamma rays detected by the downhole detector crystal 12 during the background time intervals shown as 35. These pulses comprise data mainly from gamma rays resulting from nuclei in the vicinity of detector crystal 12 which have been excited from the capture of thermal neutrons in the time isolation period of gate 35 and may be thought of as background radiation. The gamma rays generated by the nuclear absorption of thermalized neutrons will be referred to hereafter as capture gamma rays. THe output signals from the time gate 22A comprise a sequence of count pulses occurring in time intervals 37 of FIG. 2. These are primarily gamma rays due to the capture of thermal neutrons. When added to the background capture gamma rays from time gate 22 the resultant sum may be supplied to pulse height analyzer 24 for analysis of the capture gamma ray spectrum.

Figure 3A:
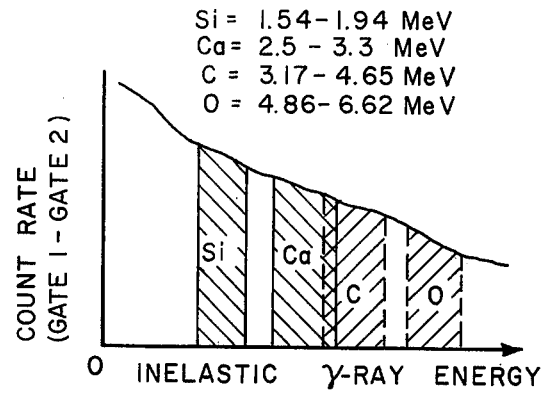
FIGS. 3a and 3b are graphical representations of a gamma ray energy spectrum resulting from the inelastic scattering of neutrons and the capture of thermal neutrons and showing the relative locations of the carbon, oxygen, silicon and calcium inelastic and capture gamma ray energy windows.
Figure 3B:
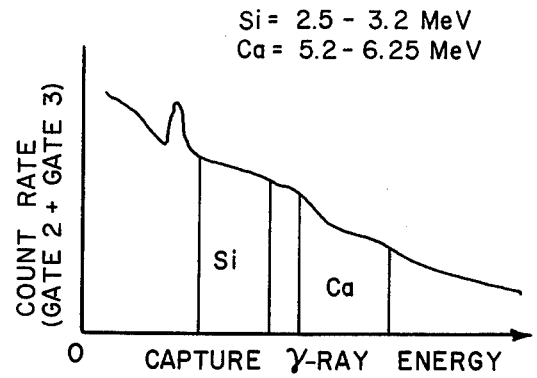

Referring now to FIG. 3b of the capture gamma ray spectrum analyzed by pulse height analyzer 24 of FIG. 1 is shown schematically. Capture gamma rays occurring in time regions 35 and 37 of FIG. 2 are supplied to pulse height analyzer 24. A capture calcium energy window extending from about 5.2 MEV to about 6.25 MEV is used to separate those gamma rays produced in these time intervals due to calcium thermal neutron capture. A capture silicon energy window extending from about 2.5 MEV to about 3.2 MEV is used to separate those gamma rays produced in these time intervals due to silicon thermal neutron capture. These energy "windows: are shown in FIG. 3b. Outputs signals representative of these capture calcium and silicon gamma rays are then supplied to the salinity computer 27 of FIG. 1 where they are combined with porosity information (possibly from another source such as a sonic or density log) supplied from a porosity memory device 38 as will be subsequently described to derive a salinity indication.

Referring now to FIG. 3a, the relative inelastic gamm ray count rate as a function of energy is shown for a typical earth formation. Two energy windows which are placed in a position chosen to emphasize the inelastic scattering gamma ray peaks of carbon and oxygen are shown superimposed over the gamma ray energy spectrum. It has been found preferable to use a carbon energy window extending from approximately 3.17 to 4.65 MEV. An oxygen energy window is chosen to extend from 4.86 to 6.62 MEV. The carbon and oxygen inelastic scattering peaks are covered together with their corresponding single and double pair production escape peaks. It will be understood, of course, that slight variations of this placement of energy windows could be made if desired without compromising the inventive concept drastically. Calcium and silicon inelastic energy windows of 1.54–1.94 and 2.5–3.3 MEV respectively, are also selected.

Output signals from the inelastic gamma ray time gate 25 and background time gate 22 similarly comprise a sequence of count pulses resulting from inelastic gamma rays occurring during the time intervals 36 and 35 of FIG. 2 in the vicinity of the detector crystal 12 of FIG. 1. The inelastic gamma rays counts occurring in time interval 36 of FIG. 2 may be used, when corrected for background by subtracting off those counts occurring in time interval 35, to compute the C/O ratio and inelastic Ca/Si ratio, as, for example, in the ratio computer 40. These data are also supplied to the salinity computer 27 to be used in the manner to be described to derive an estimate of the chlorine content of earth formations 3.

By supplying the inelastic gamma ray counts from the time gate 25 to a second pulse height analyzer 28 these may be broken down into their respective energy windows and stored in the same manner discussed with respect to the processing of the thermal neutron capture gamma ray counts by the pulse height analyzer 24. (Actually pulse height analyzers 24 and 28 may comprise two portions of the memory of a single device if desired). Thus carbon and oxygen inelastic gamma ray data (when corrected for background), labelled C and O may be supplied to the C/O ratio computer 40 in this way. Also, the corrected inelastic Ca and Si may be supplied to the computer 40 to derive an inelastic Ca/Si ratio.

For this purpose the placement of the time isolation interval 35 in the timing sequence is chosen to terminate as close as possible to the beginning of the detector cycle for the inelastic gamma rays. Time isolation interval 35 for background counting terminates just prior to the beginning of the inelastic gamma ray counting cycle 36. This interval 35 is of about the same duration as the inelastic gamma ray time isolation interval 36. In this manner the thermal neutron gamma ray population which is sampled in the background time gate interval 35 is practically the same as that which causes the portion of the counts during the inelastic time gating interval 35 and which in reality are contributed by the capture of lingering thermal neutrons. The duration preferred for background time gate opening to obtain the estimate of the thermal neutron gammas has been found to be about 5 microseconds. This duration could, of course, vary depending on conditions in the well. This interval should be chosen so as to sample the neutron population at a time when it approximates best the thermal neutrons remaining from the previous high energy neutron pulse while providing an adequate integral count for statistical accuracy.

By subtracting away the undesired background resulting from thermal neutrons in the inelastic C/O and Ca/Si ratio computer 40 more accurate inelastic scattering carbon/oxygen and calcium/silicon ratios are is generated. These may be recorded on a record medium 29 by a recorder 30 driven as a function of borehole depth by the sheave wheel 9. In the other energy windows such as those for Si and Ca as illustrated in FIG. 3, the background subtraction principle may also be applied to these data as described above. This operation is also performed in the Ca/Si ratio computer 40 of FIG. 1 and the resultant background corrected Ca/Si inelastic gamma ray curve is plotted as a function of depth on the recorder 30. This curve provides an indication of the earth formation lithology which assists in interpreting the C/O ratio and in deriving the chlorine content of the formations.

Since calcium and chlorine have very similar capture gamma ray spectra, the thermal neutron capture calcium energy window is influenced by changes in the chloride content of the formation fluid. This dependence makes possible the differentiation of hydrocarbons from saltwater bearing sands and shales in intervals of relatively constant porosity and limestone content.

The inelastic Ca/Si ratio is not substantially affected by changing salinity of interstitial formation fluid. By combining the capture and inelastic Ca/Si ratios it is possible to measure quantitatively the chloride content of sand and shale formations, independent of the presence of limestone. This can be seen in Table I, below which presents measured inelastic and capture Ca/Si values in oil and saltwater saturated sand and limestone formations. The similarity of the response of the two ratios (both increase) across limestone/sand contacts, and the difference across oil sand/saltwater sand contacts illustrates this capability.

TABLE I

| Formation | Porosity | Capture Ca/Si | Inelastic Ca/Si |
|---|---|---|---|
| Sand & oil* | 35% | 0.36 | 0.49 |
| Sand & S.water | 35 | 0.54 | 0.49 |
| Lime & Oil (paraffin)* | 30 | 0.59 | 0.55 |
| Lime & S.water | 29 | 0.57 | 0.55 |

*Fresh water same as oil

Since the total chloride content of the formation is usually directly related to the available pore space, the porosity must also be known (i.e. changes in porosity must be known) before the capture and inelastic ratios can be combined and interpreted. This porosity indication may be obtained from either conventional porosity logs or from the summation of the various Ca,Si,C and O counting rates (all of which are inversely related to formation hydrogen index). For example, the use of the C + O count rate is one possible combination.

It should be noted that the aforementioned technique for measuring formation salinity (chlorine content) in no way can differentiate oil from fresh water saturated sands, however this capability is provided if the inelastic C/O ratio is used in conjunction with the capture and inelastic Ca/Si ratio values.

If the salinity of the formation fluid were known to be constant, then the combination of the Ca/Si ratios could also be used as a direct porosity indicator in itself, since in that event, formation porosity would be linearly related to the amount of chlorine present. This provides yet another way to estimate formation porosity with the system of FIG. 1.

Figure 4:
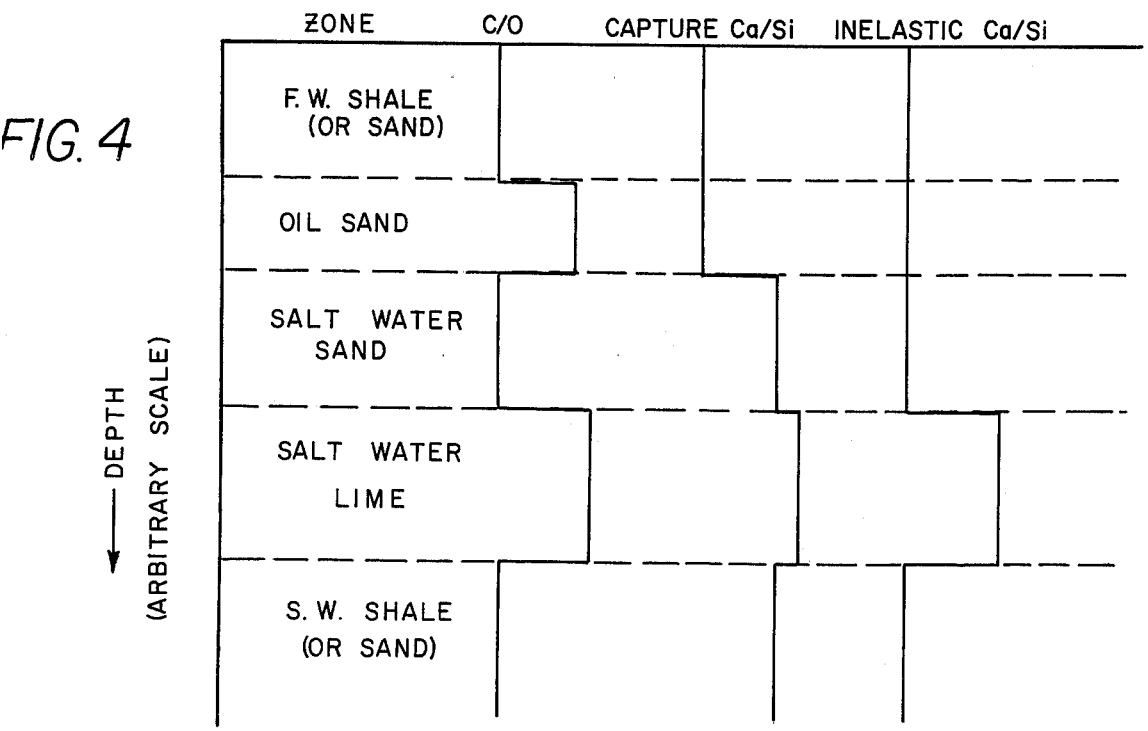
FIG. 4 illustrates the log response of a system in accordance with the invention in certain types of earth formations, schematically.

FIG. 4 graphically illustrates the Ca/Si comparison technique. Note that the two (capture and inelastic) Ca/Si ratios have similar responses in all but the saltwater sand and shale. The water salinity can be estimated for these zones from the magnitude of the deviation between the two Ca/Si ratios. Note that in the illustration of FIG. 4 the C/O ratio differentiates the oil from the fresh water zones.

These computations and comparisons are performed in the salinity computer 27 of FIG. 1. Salinity computer 27 is provided with the outputs of both inelastic and capture pulse height analyzers 24 and 28. The computer 27 may be a small general purpose digital computer such as the model PDP-11 made by the Digital Equipment Corporation of Cambridge, Mass. Such a computer may be programmed in a commonly used compiler language such as FORTRAN to perform the necessary porosity estimations (if an outside porosity source 38 is not used) and comparisons of the inelastic and capture Ca/Si ratio measurements to obtain a quantitative estimate of the chlorine content of the formations. These quantities are then supplied to the recorder 30 where they are recorded as a function of borehole depth. If an external porosity source 38 is used, it is depth synchronized (as indicated by dotted line 41 with the other data to the sheave wheel 9.

The above descriptions may make other embodiments of the invention apparent to those skilled in the art. The aim of the appended claims is to cover all such embodiments as fall within the true spirit and scope of the invention.

We claim:

1. A method for measuring the salinity of earth formations in the vicinity of a well borehole, comprising the steps of:
repetitively irradiating the earth formations in the vicinity of a well borehole with relatively short duration bursts of high energy neutrons;
detecting and counting gamma rays attributable to the inelastic scattering of fast neutron by carbon, oxygen, silicon and calcium, essentially only during said repetitive neutron bursts;
detecting and counting essentially only during the time interval between said neutron bursts, gamma rays attributable to the capture of thermal neutrons by calcium, chlorine and silicon;
detecting and counting just prior to each such repetitive neutron burst background gamma rays attributable to the capture of lingering thermal neutrons from a prior neutron burst and subtracting counts representative of such background gamma rays from counts representative of inelastic neutron scattering gamma rays from carbon, oxgyen, silicon and calcium to correct such representative inelastic scattering gamma ray counts for such background; and
comparing said inelastic scattering counts attributable to silicon and calcium with said capture gamma ray counts attributable to silicon, chlorine and calcium as a function of earth formation porosity to derive an estimate of the salinity of earth formations in the borehole vicinity.

2. The method of claim 1 wherein the detecting and counting steps are performed by separating the detection of gamma radiation into three separate time intervals, a first time interval substantially coincident with each of said neutron burst and two separate and distinct additional time intervals each beginning and ending in the time between such neutron bursts.

3. The method of claim 1 wherein said neutron bursts are approximately 5 microseconds in duration and are repeated at approximately 20,000 times per second.

4. The method of claim 2 wherein in each of said time intervals gamma radiations attributable to carbon, oxygen, silicon and calcium are separated on the basis of energy discrimination from each other.

5. The method of claim 4 wherein during said first time interval energy ranges are used corresponding to approximately 3.17 MEV to 4.65 MEV for carbon, from approximately 4.86 MEV to 6.62 MEV for oxygen, from approximately 1.54 MEV to 1.94 MEV for calcium and from approximately 2.5 MEV to 3.3 MEV for silicon.

6. The method of claim 5 wherein during one of said two additional separate time intervals between said neutron bursts, the same energy ranges are used to separate the respective background gamma radiation as during said first time interval.

7. The method of claim 6 wherein during the other of said two additional separate time intervals between said neutron bursts energy range discrimination corresponding to the range from 5.2 to 6.25 MEV is used to separate calcium capture gamma rays and the range from 2.5 to 3.2 MEV is used to separate silicon capture gamma rays from other gamma radiation occurring in such time interval.

8. The method of claim 1 and further including the step of estimating the earth formation porosity by forming a sum of the inelastic gamma radiation counts attributable to carbon, oxygen, silicon and calcium.

9. The method of claim 8 wherein said porosity estimate is performed by summing the counts attributable to carbon and oxygen inelastic scattering gamma rays only.

10. The method of claim 1 and further including the step of estimating the earth formation porosity by forming the ratios of counts attributable to capture calcium and silicon gamma rays and inelastic scattering calcium and silicon gamma rays.

* * * * *